United States Patent
Nishimura

(10) Patent No.: US 9,872,161 B2
(45) Date of Patent: Jan. 16, 2018

(54) COMMUNICATION SYSTEM, PORTABLE COMMUNICATION DEVICE, AND WIRELESS COMMUNICATION METHOD FOR EMERGENCY TRANSMISSION

(71) Applicant: FUJITSU LIMITED, Kawasaki-shi, Kanagawa (JP)

(72) Inventor: Satoshi Nishimura, Bellevue, WA (US)

(73) Assignee: FUJITSU LIMITED, Kawasaki (JP)

( * ) Notice: Subject to any disclaimer, the term of this patent is extended or adjusted under 35 U.S.C. 154(b) by 8 days.

(21) Appl. No.: 14/697,799

(22) Filed: Apr. 28, 2015

(65) Prior Publication Data

US 2015/0327041 A1 Nov. 12, 2015

(30) Foreign Application Priority Data

May 7, 2014 (JP) ................. 2014-096312

(51) Int. Cl.
*H04M 3/00* (2006.01)
*H04B 17/00* (2015.01)
(Continued)

(52) U.S. Cl.
CPC ............ *H04W 4/22* (2013.01); *G08B 25/009* (2013.01); *G08B 25/016* (2013.01); *G08B 29/18* (2013.01); *H04W 4/005* (2013.01); *H04W 4/025* (2013.01); *H04W 52/0277* (2013.01); *G08B 15/004* (2013.01); *G08B 25/001* (2013.01); *H04L 69/28* (2013.01); *H04W 4/008* (2013.01);
(Continued)

(58) Field of Classification Search
CPC .... G08B 21/0286; H04L 69/28; H04W 4/005; H04W 4/008; H04W 4/023; H04W 4/025; H04W 4/22; H04W 52/0277; H04W 88/02; H04W 88/08

USPC ................................................. 455/418, 419
See application file for complete search history.

(56) References Cited

U.S. PATENT DOCUMENTS 7,375,632 B1* 5/2008 Sebanc .............. G08B 21/0294
340/505
2002/0041251 A1* 4/2002 Yamaashi ................ G01S 5/02
342/357.21
(Continued)

FOREIGN PATENT DOCUMENTS

| JP | 2002-223322 | 8/2002 |
| JP | 2010-045490 | 2/2010 |
| JP | 2012-59231 | 3/2012 |

OTHER PUBLICATIONS

EESR—Extended European Search Report dated Sep. 23, 2015 for European Patent Application No. 15161519.2.
(Continued)

*Primary Examiner* — Rafael Pérez-Gutiérrez
*Assistant Examiner* — Mark G. Pannell
(74) *Attorney, Agent, or Firm* — Fujitsu Patent Center

(57) ABSTRACT

A communication system includes a wireless master device, a wireless client device, and a base station, wherein, the wireless client device starts wireless transmission to the base station when the wireless client device receives a start instruction sent from the wireless master device in accordance with a predetermined operation performed with respect to the wireless master device and stops the wireless transmission when the wireless client device receives a stop instruction from the wireless master device after the starting of the wireless transmission.

5 Claims, 5 Drawing Sheets

(51) Int. Cl.
*H04M 11/04* (2006.01)
*H04W 4/22* (2009.01)
*H04W 4/00* (2009.01)
*H04W 4/02* (2009.01)
*H04W 52/02* (2009.01)
*G08B 25/01* (2006.01)
*G08B 29/18* (2006.01)
*H04W 88/02* (2009.01)
*H04W 88/08* (2009.01)
*H04L 29/06* (2006.01)
*G08B 15/00* (2006.01)
*G08B 25/00* (2006.01)

(52) U.S. Cl.
CPC ............ *H04W 4/023* (2013.01); *H04W 88/02* (2013.01); *H04W 88/08* (2013.01); *Y02B 60/50* (2013.01)

(56) References Cited

U.S. PATENT DOCUMENTS

| | | | | |
|---|---|---|---|---|
| 2006/0085847 | A1* | 4/2006 | Ikeuchi | G06F 21/35 726/6 |
| 2007/0082652 | A1* | 4/2007 | Hartigan | G08B 21/0277 455/404.2 |
| 2008/0025249 | A1* | 1/2008 | Kuppuswamy | H04B 7/18567 370/325 |
| 2009/0024313 | A1* | 1/2009 | Hahn | G01C 21/3661 701/532 |
| 2010/0056134 | A1* | 3/2010 | Yasumi | H04W 24/10 455/424 |
| 2010/0238803 | A1* | 9/2010 | Racz | H04L 47/10 370/235 |
| 2013/0237259 | A1* | 9/2013 | Umehara | H04W 60/00 455/500 |
| 2014/0003338 | A1* | 1/2014 | Rahul | H04B 7/024 370/328 |
| 2014/0004869 | A1* | 1/2014 | Jung | H04W 72/0446 455/452.1 |
| 2014/0073262 | A1* | 3/2014 | Gutierrez | H04M 1/7253 455/67.11 |
| 2014/0247124 | A1* | 9/2014 | Ros | G08B 15/004 340/539.11 |
| 2014/0254799 | A1* | 9/2014 | Husted | H04L 63/068 380/270 |

OTHER PUBLICATIONS

"Logitech Squeezebox Owner's Guide", Mar. 25, 2014, pp. 1-32, retrieved from: http://web.archive.org/web/20140325065641/http://www.logitech.com/assets/32377/squeezeboxclassic-ownersguide.pdf, [retrieved on Aug. 31, 2015], XP055210235.

JPOA—Japanese Office Action dated Dec. 5, 2017 for Japanese Patent Application No. 2014-096312, with machine translation.

* cited by examiner

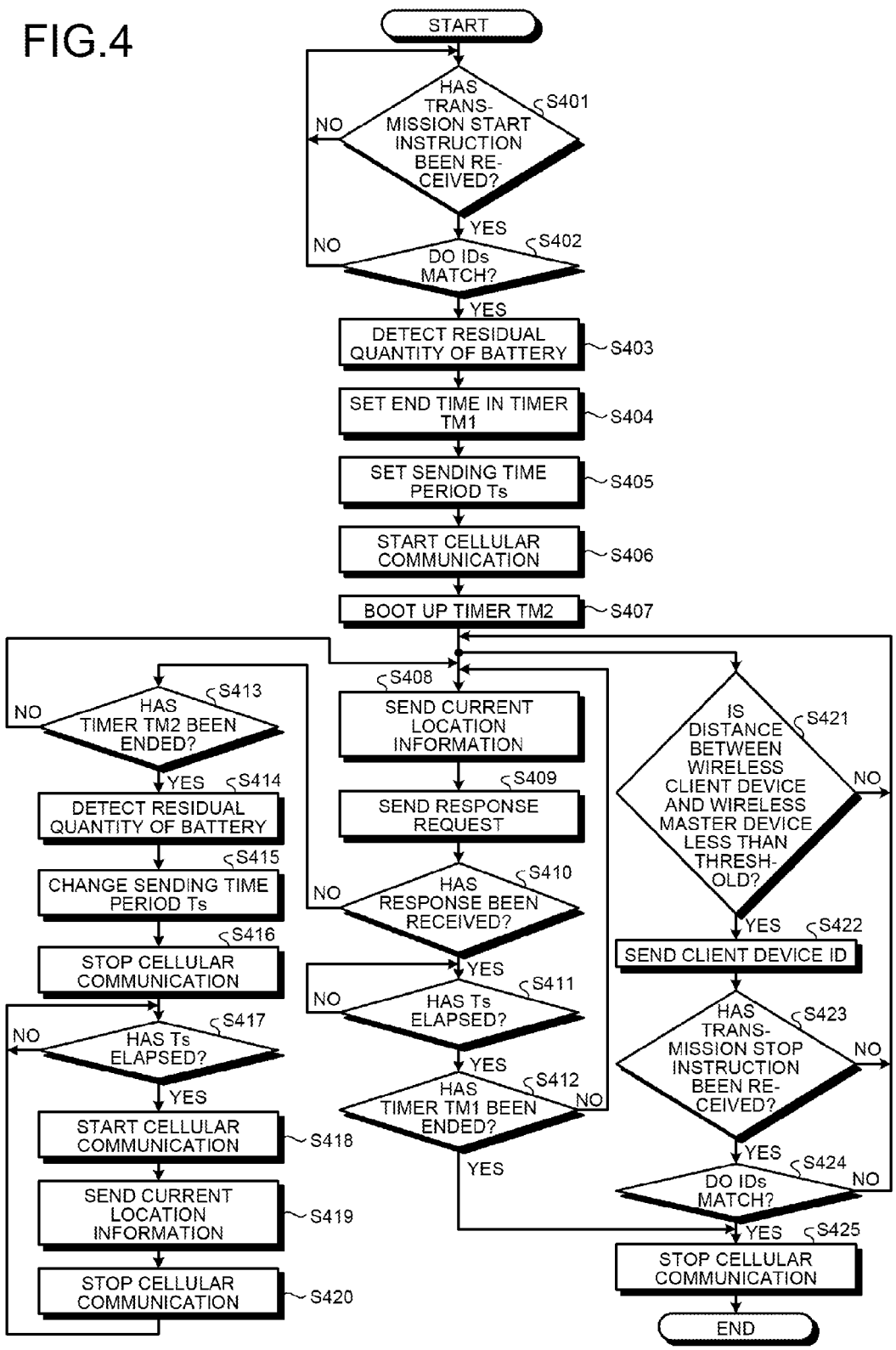

FIG.5

| RESIDUAL QUANTITY OF BATTERY (VOLTAGE) | END TIME |
|---|---|
| EQUAL TO OR GREATER THAN 80% (EQUAL TO OR GREATER THAN 3.8 V) | 180 HOURS |
| EQUAL TO OR GREATER THAN 40% AND LESS THAN 80% (EQUAL TO OR GREATER THAN 3.5 V AND LESS THAN 3.8 V) | 90 HOURS |
| LESS THAN 40% (LESS THAN 3.5 V) | 30 HOURS |

FIG.6

| RESIDUAL QUANTITY OF BATTERY (VOLTAGE) | SENDING TIME PERIOD Ts | |
|---|---|---|
| | INITIAL VALUE | AFTER 12 HOURS HAVE ELAPSED |
| EQUAL TO OR GREATER THAN 80% (EQUAL TO OR GREATER THAN 3.8 V) | 2 MINUTES | 30 MINUTES |
| EQUAL TO OR GREATER THAN 40% AND LESS THAN 80% (EQUAL TO OR GREATER THAN 3.5 V AND LESS THAN 3.8 V) | 2 MINUTES | 60 MINUTES |
| LESS THAN 40% (LESS THAN 3.5 V) | 4 MINUTES | 120 MINUTES |

COMMUNICATION SYSTEM, PORTABLE COMMUNICATION DEVICE, AND WIRELESS COMMUNICATION METHOD FOR EMERGENCY TRANSMISSION

CROSS-REFERENCE TO RELATED APPLICATION

This application is based upon and claims the benefit of priority of the prior Japanese Patent Application No. 2014-096312, filed on May 7, 2014, the entire contents of which are incorporated herein by reference.

FIELD

The embodiments discussed herein are related to a communication system, a portable communication device, and a wireless communication method.

BACKGROUND

There are proposed mobile terminals that can transmit emergency calls to message centers with a one-touch operation in emergency situations, such as users are aware of danger, users have problems with their physical condition, or the like.

Related-art examples are described, for example, in Japanese Laid-open Patent Publication No. 2002-223322 and Japanese Laid-open Patent Publication No. 2010-045490.

However, there may be a case in which a malicious person robs a mobile terminal and thus transmission of an emergency call is compulsory canceled. As conceivable countermeasures against the problem described above, by setting a password only known by a user to a mobile terminal or by performing fingerprint authentication by using a mobile terminal, after the emergency call is transmitted, an operation of the mobile terminal performed by the malicious person is made to be impossible. However, even with these countermeasures, if the malicious person robs the mobile terminal and the mobile terminal loses a transmission function, the user is not able to continuously transmit the emergency call any more.

SUMMARY

According to an aspect of an embodiment, a communication system includes a wireless master device, a wireless client device, and a base station, wherein the wireless client device starts wireless transmission to the base station when the wireless client device receives a start instruction sent from the wireless master device in accordance with a predetermined operation performed with respect to the wireless master device and stops the wireless transmission when the wireless client device receives a stop instruction from the wireless master device after the starting of the wireless transmission.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a flowchart illustrating the flow of a process performed by the wireless client device according to the first embodiment;

FIG. 5 is a schematic diagram illustrating the operation of the wireless client device according to the first embodiment;

FIG. 6 is a schematic diagram illustrating the operation of the wireless client device according to the first embodiment.

DESCRIPTION OF EMBODIMENTS

Preferred embodiments of the present invention will be explained with reference to accompanying drawings. The communication system, the portable communication device, and the wireless communication method disclosed in the present invention are not limited to these embodiments.

[a] First Embodiment

<Configuration Example of a Communication System>

Figure 1:
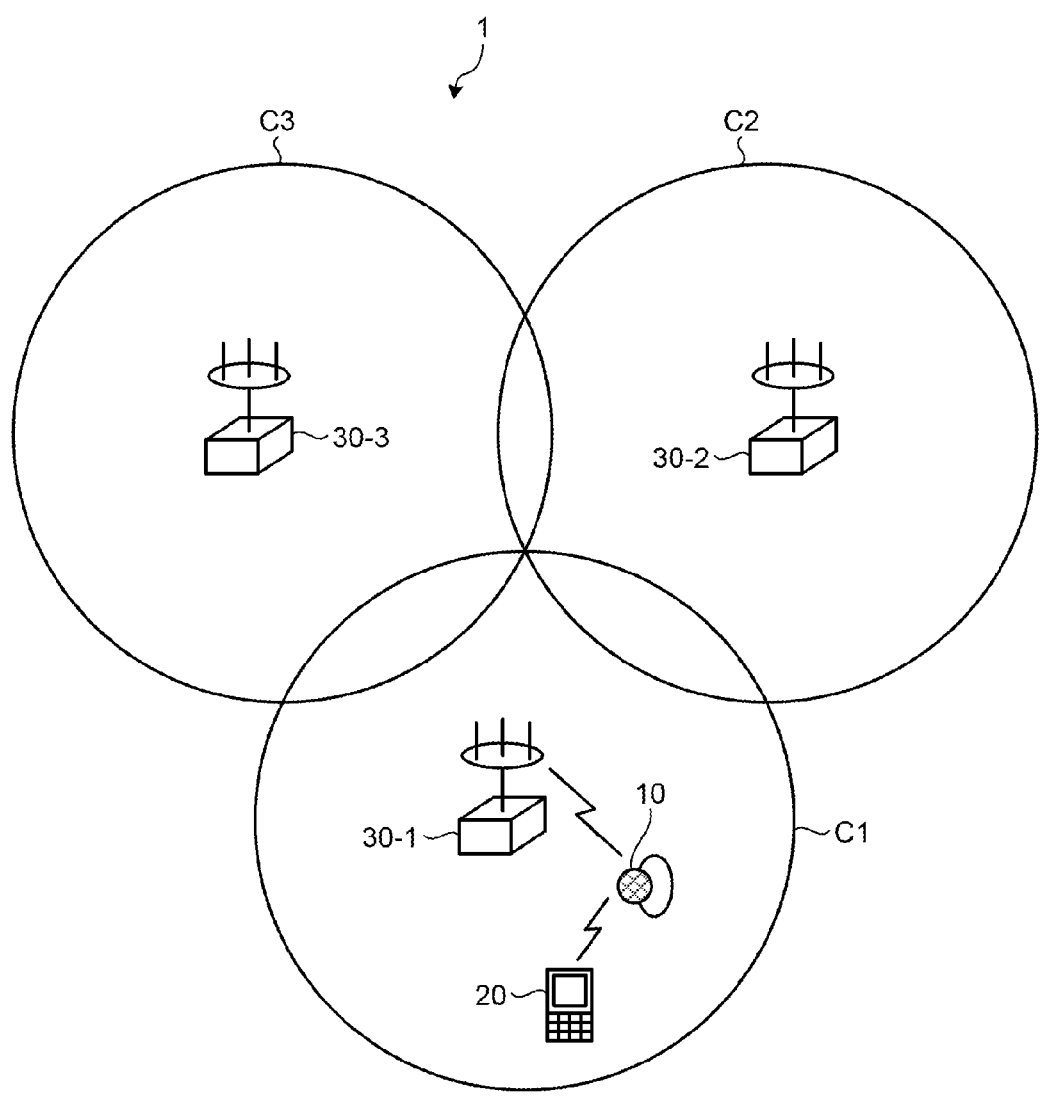
FIG. 1 is a schematic diagram illustrating a configuration example of a communication system according to a first embodiment.

FIG. 1 is a schematic diagram illustrating a configuration example of a communication system according to a first embodiment. In FIG. 1, a communication system 1 includes cellular base stations 30-1 to 30-3, a wireless client device 10 that is a portable communication device, and a wireless master device 20 that is a portable communication device. The cellular base stations 30-1 to 30-3 form communication areas C1 to C3. The wireless master device 20 can communicate with the wireless client device 10. The wireless client device 10 can communicate with the wireless master device 20 and the cellular base stations 30-1 to 30-3, respectively. In FIG. 1, because the wireless client device 10 is located in the communication area C1, the wireless client device 10 can communicate with the cellular base station 30-1 from among the cellular base stations 30-1 to 30-3. In a description below, if the cellular base stations 30-1 to 30-3 are not particularly distinguished, the cellular base stations 30-1 to 30-3 are simply referred to as a cellular base station 30.

<Configuration Example of a Wireless Client Device>

Figure 2:
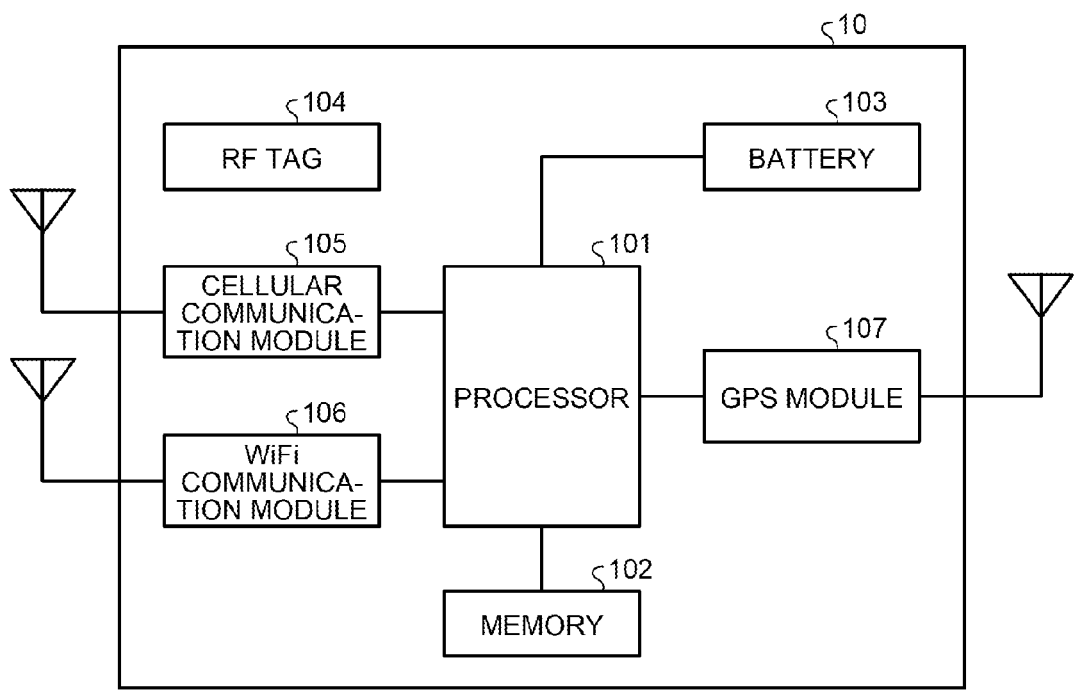
FIG. 2 is a schematic diagram illustrating a configuration example of a wireless client device according to the first embodiment.

FIG. 2 is a schematic diagram illustrating a configuration example of a wireless client device according to the first embodiment. In FIG. 2, the wireless client device 10 includes a processor 101, a memory 102, and a battery 103. Furthermore, the wireless client device 10 includes a radio frequency (RF) tag 104, a cellular communication module 105, a wireless fidelity (WIFI) communication module 106, and a global positioning system (GPS) module 107.

The wireless client device 10 is, for example, a small-size wearable terminal and preferably has exterior appearance, such as a wristband type, a finger ring type, a pendant type, or the like, that does not seem to be a portable communication device by persons other than a user who uses the wireless client device 10.

The processor 101 performs various kinds of processing of the wireless client device 10. In particular, the processor 101 controls the cellular communication module 105 and the WIFI communication module 106, thereby the processor 101 controls communication with the cellular base station 30 and communication with the wireless master device 20.

Furthermore, the processor 101 detects, under a predetermined condition, the residual quantity of the battery 103 and controls communication with the cellular base station 30 in accordance with the detected residual quantity. Furthermore, the processor 101 includes a timer (not illustrated) and controls communication with the cellular base station 30 in accordance with the elapsed time of the timer. Furthermore, the processor 101 sends the current location of the wireless client device 10 measured by the GPS module 107 to the cellular base station 30 by using the cellular communication module 105. The process performed by the processor 101 will be described in detail later. An example of the processor 101 includes a central processing unit (CPU), a digital signal processor (DSP), a field programmable gate array (FPGA), or the like.

The memory 102 stores a client device identifier (ID) unique to the wireless client device 10 and a master device ID that is unique to the wireless master device 20 and that is paired with the wireless client device 10. Furthermore, the memory 102 stores various programs that cause the processor 101 to perform various processes. An example of the memory 102 includes a random access memory (RAM), such as a synchronous dynamic random access memory (SDRAM) or the like, a read only memory (ROM), a flash memory, and the like.

The battery 103 is a power supply of the wireless client device 10 and accumulates electrical power that is used to operate the wireless client device 10.

The RF tag 104 sends and receives information to and from a radio frequency identifier (RFID) reader included in the wireless master device 20 by using near field wireless communication. The RF tag 104 stores therein a client device ID that is unique to the wireless client device 10 and sends the client device ID to the RFID reader when the RF tag 104 approaches the RFID reader.

The cellular communication module 105 performs wireless communication with the cellular base station 30 in accordance with the cellular communication. An example of the communication method of the cellular communication includes a 3G method, an LTE method, or the like.

The WIFI communication module 106 performs wireless communication with the wireless master device 20 in accordance with the WIFI communication method.

The GPS module 107 measures the current location of the wireless client device 10 and outputs information that indicates the current location (hereinafter, sometimes referred to as "current location information") of the wireless client device 10 to the processor 101.

<Configuration Example of a Wireless Master Device>

Figure 3:
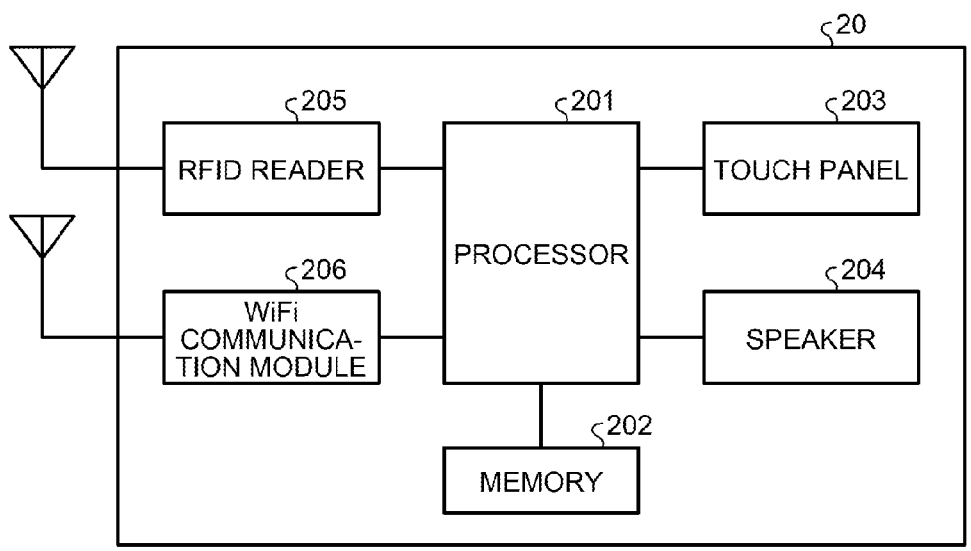
FIG. 3 is a schematic diagram illustrating a configuration example of a wireless master device of the first embodiment.

FIG. 3 is a schematic diagram illustrating a configuration example of a wireless master device of the first embodiment. In FIG. 3, the wireless master device 20 includes a processor 201, a memory 202, a touch panel 203, a speaker 204, an RFID reader 205, and a WIFI communication module 206.

The wireless master device 20 is, for example, a smart phone, a tablet device, and the like.

The processor 201 performs various kinds of processing of the wireless master device 20. In particular, the processor 201 controls the WIFI communication module 206, thereby the processor 201 controls communication with the wireless client device 10. Furthermore, the processor 201 controls communication with the wireless client device 10 on the basis of a predetermined operation performed on the touch panel 203. Furthermore, the processor 201 sounds the speaker 204 by outputting a predetermined audio signal to the speaker 204. The process performed by the processor 201 will be described in detail later. An example of the processor 201 includes a CPU, a DSP, an FPGA, or the like.

The memory 202 stores therein a master device ID unique to the wireless master device 20 and a client device ID that is unique to the wireless client device 10 and that is paired with the wireless master device 20. Furthermore, the memory 202 stores therein various programs that cause the processor 201 to perform various processes. An example of the memory 202 includes a RAM, such as an SDRAM or the like, a ROM, a flash memory, or the like.

The touch panel 203 includes a liquid crystal panel on which various kinds of information are displayed under the control of the processor 201 and includes a touch sensor that detects the touch position on a touch panel 12 and that outputs the position to the processor 201. The touch panel 203 is attached to the surface of the wireless master device 20. The liquid crystal panel and the touch sensor are laminated.

The speaker 204 sounds in accordance with a predetermined audio signal that is input by the processor 201.

The RFID reader 205 sends and receives information to and from the RF tag 104 included in the wireless client device 10 by using near field wireless communication. When the RF tag 104 approaches the RFID reader 205, the RFID reader 205 reads the client device ID stored in the RF tag 104 from the RF tag 104.

The WIFI communication module 206 performs wireless communication with the wireless client device 10 in accordance with a WIFI communication method.

<Operation of a Process Performed by the Wireless Client Device>

FIG. 4 is a flowchart illustrating the flow of a process performed by the wireless client device according to the first embodiment. The flowchart illustrated in FIG. 4 is started when the power supply of the wireless client device 10 is turned on.

In the wireless client device 10, the processor 101 waits until a transmission start instruction from the wireless master device 20 is received by the WIFI communication module 106 (No at Step S401). The transmission start instruction includes therein the client device ID of the wireless client device 10 and the master device ID of the wireless master device 20. Furthermore, the wireless master device 20 may also include the transmission start instruction in a beacon signal and perform transmission.

When the processor 101 receives the transmission start instruction from the wireless master device 20 (Yes at Step S401), the processor 101 determines whether the client device ID and the master device ID included in the transmission start instruction match the client device ID and the master device ID stored in the memory 102, respectively (Step S402). If the client device IDs or the master device IDs do not match (No at Step S402), the process returns to Step S401.

At Step S402, if both the client device IDs and the master device IDs do match (Yes at Step S402), the processor 101 detects the residual quantity of the battery 103 (hereinafter, sometimes referred to as a "residual quantity of a battery") (Step S403).

Then, after setting the end time in the timer TM1 in accordance with the residual quantity of the battery detected at Step S403, the processor 101 boots up the timer TM1 (Step S404). The processor 101 sets the end time of the timer TM1 as follows. FIG. 5 is a schematic diagram illustrating the operation of the wireless client device according to the first embodiment. FIG. 5 illustrates, as an example, a case in which the voltage of the battery 103 is 4.2 V when the battery 103 is fully charged. The processor 101 obtains the residual quantity of the battery from the voltage of the battery 103. If, for example, the residual quantity of the battery is equal to or greater than 80%, the processor 101 sets the end time of the timer TM1 to 180 hours. Furthermore, for example, if residual quantity of the battery is equal to or greater than 40% and is less than 80%, the processor 101 sets the end time of the timer TM1 to 90 hours and, if the residual quantity of the battery is less than battery 40%, the processor 101 sets the end time of the timer TM1 to 30 hours. Namely, the processor 101 sets the end time of the timer TM1 to a smaller value as the residual quantity of the battery is decreased.

Then, the processor 101 sets a sending time period Ts in accordance with the residual quantity of the battery detected at Step S403 (Step S405). The processor 101 sets the sending time period Ts as follows. FIG. 6 is a schematic diagram illustrating the operation of the wireless client device according to the first embodiment. Similarly to FIG. 5, FIG. 6 illustrates, as an example, a case in which the voltage of the battery 103 is 4.2V when the battery 103 is fully charged. If the residual quantity of the battery is, for example, equal to or greater than 40% as the initial value of the sending time period Ts, the processor 101 sets the sending time period Ts to 2 minutes and, if the residual quantity of the battery is less than 40%, the processor 101 sets the sending time period Ts to 4 minutes. Namely, at Step S405, the processor 101 sets a greater initial value of the sending time period Ts as the residual quantity of the battery is decreased. Furthermore, the sending time period Ts can be used to measure time intervals by repeatedly setting the end time Ts to the timer.

Then, the processor 101 boots up the cellular communication module 105 and starts the cellular communication (Step S406) and boots up the GPS module 107. Furthermore, the processor 101 boots up the timer TM2 (Step S407). Namely, when a transmission start instruction that is sent from the wireless master device 20 is received by the WIFI communication module 106 (Yes at Step S401), the processor 101 starts wireless transmission to the cellular base station 30 by using the cellular communication module 105 (Step S406). By doing so, the wireless transmission from the wireless client device 10 is started by the cellular base station 30. Furthermore, the elapsed time since the starting of the wireless transmission to the cellular base station 30 is measured by the timer TM2. In the timer TM2, for example, 12 hours are set in advance as the end time.

After the cellular communication is started, the processor 101 sends, by using the cellular communication module 105, the current location information to the cellular base station 30 together with the current time (Step S408). The transmission interval of this current location information matches the sending time period Ts that is set at Step S405 by the process at Step S411, which will described below.

Then, the processor 101 sends, by using the WIFI communication module 106, a response request to the wireless master device 20 (Step S409).

The processor 101 determines whether the response that is sent from the wireless master device 20 and that is a response to the sent response request is received by the WIFI communication module 106 (Step S410). If the response from the wireless master device 20 is received by the WIFI communication module 106 (Yes at Step S410), the processor 101 waits until the sending time period Ts has elapsed since the previous transmission of current location information (No at Step S411). In contrast, if a response from the wireless master device 20 is not received by the WIFI communication module 106 (No at Step S410), the process proceeds to Step S413.

Here, if the wireless client device 10 is located within a predetermined distance from the wireless master device 20, a response from the wireless master device 20 is received by the wireless client device 10 and, if the wireless client device 10 is located away from the wireless master device 20 by a predetermined distance, the response from the wireless master device 20 is not received by the wireless client device 10.

If the sending time period Ts has elapsed since the previous transmission of current location information (Yes at Step S411), the processor 101 determines whether the timer TM1 is ended (Step S412). If the timer TM1 is not ended (No Step S412), the process proceeds to Step S408 and the processor 101 again sends the current location information to the cellular base station 30 together with the current time.

Furthermore, after the cellular communication is started, if the wireless client device 10 approaches the wireless master device 20 by a user and if the distance therebetween is less than a threshold (Yes at Step S421), a radio wave is sent due to electricity generated in the RF tag 104 by the radio wave emitted from the RFID reader 205. Due to the sending of the radio wave, the RF tag 104 sends the client device ID stored in the RF tag 104 (Step S422). If the distance between the wireless client device 10 and the wireless master device 20 is equal to or greater than a threshold (No at Step S421), transmission of the client device ID from the RF tag 104 is not performed and the process returns to Step S408.

Then, in response to the client device ID sent at Step S422, the processor 101 determines whether the transmission stop instruction sent from the wireless master device 20 has been received by the WIFI communication module 106 (Step S423). If the transmission stop instruction has not been received (No at Step S423), the process returns to Step S408. In the transmission stop instruction, the client device ID of the wireless client device 10 and the master device ID of the wireless master device 20 are included.

When the processor 101 receives a transmission stop instruction from the wireless master device 20 (Yes at Step S423), the processor 101 determines whether the client device ID and the master device ID included in the transmission stop instruction match the client device ID and the master device ID stored in the memory 102 (Step S424). If the client device IDs or the master device IDs does not match (No at Step S424), the process returns to Step S408.

If both the client device IDs and the master device IDs match at Step S408 (Yes at Step S424), the processor 101 stops the operation of the cellular communication module 105 to stop cellular communication (Step S425). Furthermore, the processor 101 stops the operation of the GPS module 107. Namely, after the processor 101 starts the wireless transmission to the cellular base station 30 (Step S406), when the transmission stop instruction from the wireless master device 20 is received by the WIFI communication module 106 (Yes at Step S423), the processor 101 stops the wireless transmission to the cellular base station 30 (Step S408). In other words, the processor 101 continues the wireless transmission to the cellular base station 30 by using the cellular communication module 105 until the transmission stop instruction from the wireless master device 20 is received by the WIFI communication module 106 after the starting of the wireless transmission to the cellular base station 30.

Furthermore, If the timer TM1 is ended at Step S412 (Yes at Step S412), the processor 101 stops the operation of the cellular communication module 105 to stop the cellular communication (Step S425). Furthermore, the processor 101 stops the operation of the GPS module 107. Namely, in a state in which the wireless client device 10 is located within a predetermined distance from the wireless master device 20 (Yes at Step S410), if a predetermined time has elapsed since the wireless transmission cellular base station 30 was started (Yes at Step S412), the processor 101 performs the following process. Namely, regardless of whether the transmission stop instruction is received (Step S423), the processor 101 stops the wireless transmission to the cellular base station 30 (Step S425).

At Step S410, if a response from the wireless master device 20 is not received (No at Step S410), i.e., if the wireless client device 10 is located away from the wireless master device 20 by a predetermined distance, the processor 101 determines whether the timer TM2 is ended (Step S413). Namely, at Step S413, the processor 101 determines whether 12 hours has elapsed after the wireless transmission to the cellular base station 30 was started. If the timer TM2 is not ended (No at Step S413), the process returns to Step S408.

In contrast, if the timer TM2 is ended (Yes at Step S413), the processor 101 detects the residual quantity of the battery (Step S414) and changes the sending time period Ts in accordance with the detected residual quantity of the battery (Step S415). Namely, after 12 hours has elapsed since the wireless transmission to the cellular base station 30 was started, the processor 101 changes the sending time period Ts from the initial value in accordance with the time period indicated in the list illustrated in FIG. 6. For example, if the residual quantity of the battery is equal to or greater than 80% after elapse of 12 hours, the processor 101 changes the sending time period Ts to 30 minutes and, if the residual quantity of the battery is less than 80% after elapse of 12 hours, the processor 101 changes the sending time period Ts to 60 minutes. Furthermore, for example, if the residual quantity of the battery is less than 40% after elapse of 12 hours, the processor 101 changes the sending time period Ts to 120 minutes. Namely, the processor 101 controls a transmission interval of the wireless transmission in accordance with the elapsed time since the wireless transmission to the cellular base station 30 was started and in accordance with the residual quantity of the battery. Furthermore, the processor 101 sets a transmission interval that is used after a predetermined time has elapsed since the wireless transmission was started to a transmission interval that is greater than that previously used before the predetermined time has elapsed since the wireless transmission was started. The predetermined time is, for example, 12 hours. Furthermore, in the state in which the wireless client device 10 is located away from the wireless master device 20 by a predetermined distance (No at Step S410), when a predetermined time has elapsed after the wireless transmission to the cellular base station 30 was started (Yes at Step S413), the processor 101 performs the following process. Namely, the processor 101 sets the transmission interval, which is used after a predetermined time has elapsed since the wireless transmission to a transmission interval was started, to a transmission interval that is greater than that previously used before the predetermined time has elapsed since the wireless transmission was started.

Then, the processor 101 stops the operation of the cellular communication module 105 to stop the cellular communication (Step S416). Furthermore, the processor 101 stops the operation of the GPS module 107.

Subsequently, the processor 101 waits until the sending time period Ts has elapsed after the immediately previous current location information was sent (No at Step S417). If the sending time period Ts has elapsed after the immediately previous current location information was sent (Yes at Step S417), the processor 101 boots up the cellular communication module 105, starts cellular communication (Step S418), and sends the current location information to the cellular base station 30 together with the current time (Step S419).

After the current location information has been sent at Step S419, the processor 101 stops the operation of the cellular communication module 105 to stop the cellular communication (Step S420). Furthermore, the processor 101 stops the operation of the GPS module 107. After the cellular communication has been stopped, the process returns to Step S417.

<Operation of a Process Performed by the Wireless Master Device>

Figure 7:
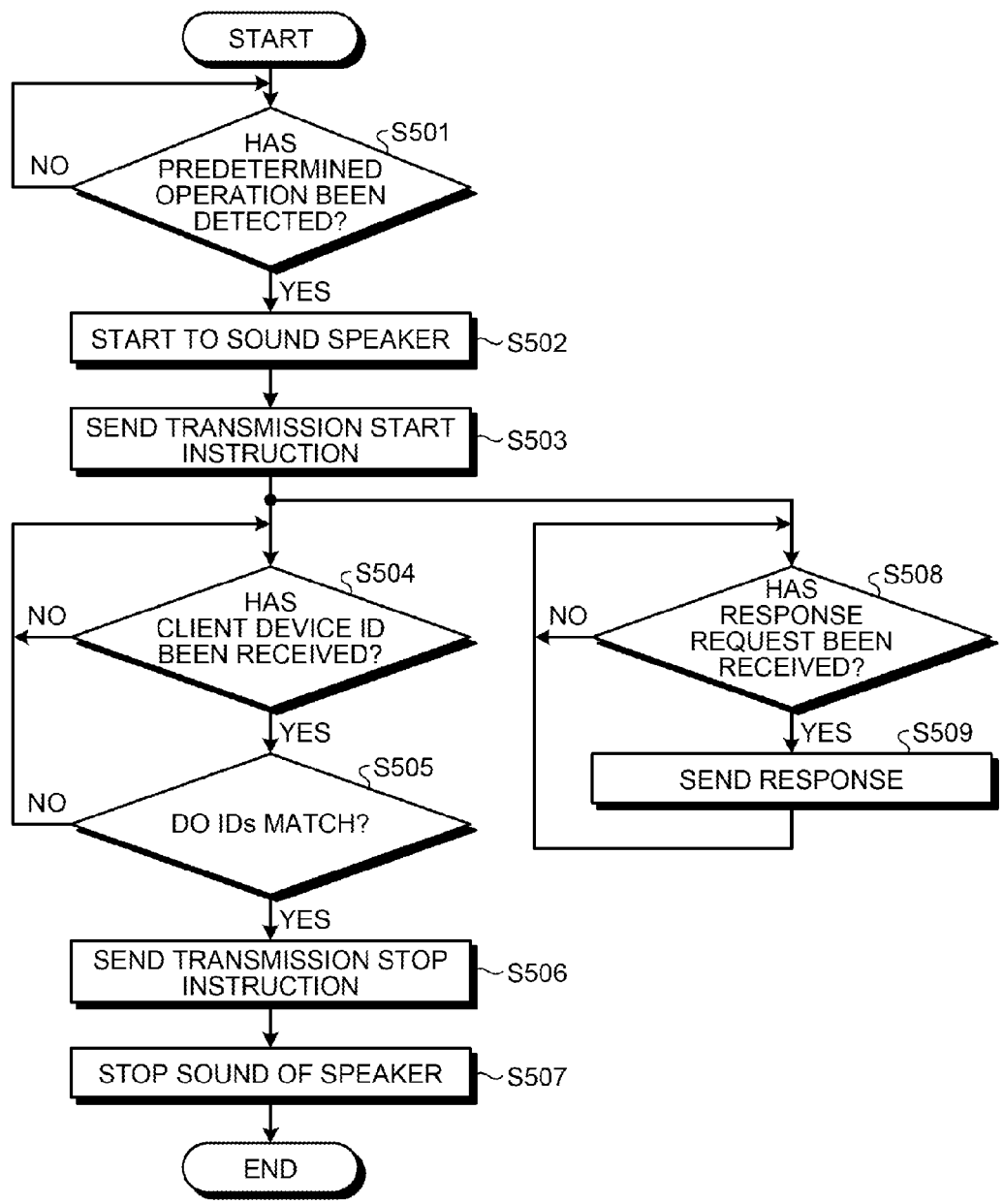
FIG. 7 is a flowchart illustrating the flow of a process performed by the wireless master device according to the first embodiment.

FIG. 7 is a flowchart illustrating the flow of a process performed by the wireless master device according to the first embodiment. The process indicated by the flowchart illustrated in FIG. 7 is started when the power supply of the wireless master device 20 is turned on.

In the wireless master device 20, the processor 201 waits until a predetermined operation performed on the touch panel 203 is detected (No at Step S501). The predetermined operation is, for example, a touch operation that is performed on an "emergency call button" displayed at the predetermined position on the touch panel 203.

When the processor 201 detects the predetermined operation performed on the touch panel 203 is detected (Yes at Step S501), the speaker 204 starts to sound (Step S502). Furthermore, the processor 201 sends a transmission start instruction to the wireless client device 10 by using the WIFI communication module 206 (Step S503).

After the transmission start instruction has been sent, the processor 201 determines whether the client device ID sent from the RF tag 104 in the wireless client device 10 has been received by the RFID reader 205 (Step S504). If the client device ID has not been received (No at Step S504), the processor 201 waits for the client device ID to be received by the RFID reader 205.

When the client device ID is received by the RFID reader 205 (Yes at Step S504), the processor 201 determines whether the received client device ID matches the client device ID stored in the memory 202 (Step S505). If both the client device IDs do not match (No at Step S505), the process returns to Step S504.

In contrast, if both the client device IDs match (Yes at Step S505), the processor 201 acquires the client device ID and the master device ID from the memory 202. Then, the processor 201 sends the transmission stop instruction, in which the acquired client device ID and the master device ID are included, to the wireless client device 10 by using the WIFI communication module 206 (Step S506).

Then, the processor 201 stops the speaker 204 sounding (Step S507).

Furthermore, after the transmission start instruction has been transmitted, the processor 201 determines whether a response request sent from the wireless client device 10 has been received by the WIFI communication module 206 (Step S508). If the response request has not been received (No at Step S508), the processor 201 waits for the response request to be received.

If the response request has been received (Yes at Step S508), the processor 201 sends a response to the response request to the wireless client device 10 by using the WIFI communication module 206 (Step S509). After the response has been sent, the process returns to Step S508.

As described above, according to the first embodiment, the communication system 1 includes the wireless client device 10, the wireless master device 20, and the cellular base station 30. The wireless client device 10 starts wireless transmission to the cellular base station 30 when the wireless client device 10 receives a transmission start instruction that is sent from the wireless master device 20 in accordance with a predetermined operation performed on the wireless master device 20 and stops the wireless transmission when the wireless client device 10 receives a transmission stop instruction from the wireless master device 20 after the starting of the wireless transmission.

Furthermore, the wireless client device 10 includes the cellular communication module 105, the WIFI communication module 106, and the processor 101. The cellular communication module 105 can communicate with the cellular base station 30. The WIFI communication module 106 can communicate with the wireless master device 20. The processor 101 starts wireless transmission to the cellular base station 30 by using the cellular communication module 105 when the transmission start instruction from the wireless master device 20 is received by the WIFI communication module 106. Furthermore, the processor 101 stops the wireless transmission to the cellular base station 30 when the transmission stop instruction from the wireless master device 20 is received by the WIFI communication module 106 after the starting of the wireless transmission to the cellular base station 30.

By doing so, for example, even when a malicious person destroys the wireless master device 20 and thus the wireless master device 20 loses a transmission function with respect to the cellular base station 30, a user can continuously perform the transmission to the cellular base station 30 by using the wireless client device 10. Consequently, it is possible to reliably continue transmission in case of emergency. For example, by using the small-size wireless client device 10 that does not seem to be a portable communication device by other persons, it is possible to prevent the wireless client device 10 from being robbed from a user by a malicious person; therefore, the current location of the wireless client device 10 can be continuously sent to the cellular base station 30. Furthermore, by using the small-size wireless client device 10 that does not seem to be a portable communication device by other persons, it is possible to prevent a user who transmits an emergency call from harm from a malicious person. Consequently, according to the embodiment, it is possible to chase a user abducted by a person in addition to secure the user's safety.

Furthermore, according to the first embodiment, in the state in which the wireless client device 10 is located away from the wireless master device 20 by a predetermined distance, when a predetermined time has elapsed since the wireless transmission was started, the processor 101 sets the transmission interval of the wireless transmission to a transmission interval that is greater than that previously used before the predetermined time has elapsed since the wireless transmission was started.

By doing so, for example, if a user who holds the wireless client device 10 is abducted by a malicious person to a distance for a long time, it is possible to reduce the consumption of the battery 103 and thus extend the transmission time period of the current location of the wireless client device 10. Consequently, it is possible to chase a user abducted by a person for a long period of time.

Furthermore, according to the first embodiment, in the state in which the wireless client device 10 is located within a predetermined distance from the wireless master device 20, when a predetermined time has elapsed since the wireless transmission was started, the processor 101 stops the wireless transmission regardless of whether the transmission stop instruction has been received.

By doing so, if, for example, a user erroneously starts wireless transmission by using the wireless client device 10, it is possible to compulsory stop, in accordance with elapse of a predetermined time, the wireless transmission performed by the wireless client device 10. Consequently, it is possible to prevent unneeded wireless transmission from the wireless client device 10 from being continued; therefore, it is possible to reduce the consumption of the battery 103 in the wireless client device 10 due to an erroneous operation performed on the wireless master device 20.

[b] Other Embodiments

[1] In the embodiment described above, a description has been given of an example of a case in which WIFI is used for a communication method that is used for the communication between the wireless client device 10 and the wireless master device 20. However, the communication method that is used for the communication between the wireless client device 10 and the wireless master device 20 is not limited to WIFI. For example, Bluetooth (registered trademark) or the like may also be used for the communication method that is used for the communication between the wireless client device 10 and the wireless master device 20.

[2] In the embodiment described above, the timer TM1, the timer TM2, and the repetition timer that counts the sending time period Ts may also be implemented by software timers.

[3] In the embodiment described above, a description has been given of an example of a case in which transmission of a transmission start instruction from the wireless master device 20 is performed on the basis of the predetermined operation that is performed on the touch panel 203. However, the transmission of the transmission start instruction from the wireless master device 20 may also be performed by a user pressing a predetermined mechanical button included in the wireless master device 20. Furthermore, the wireless master device 20 may also be, for example, a mobile phone without the touch panel 203.

[4] Each of the processes performed by the wireless client device 10 described above may also be implemented by causing the processor 101 to execute the communication control programs associated with the processes. For example, the communication control programs associated with the processes performed by the wireless client device 10 described above are stored in the memory 102 and the communication control programs may also be read from the memory 102 by the processor 101 and executed by the processor 101.

[5] Each of the processes performed by the wireless master device 20 described above may also be implemented by causing the processor 201 to execute the communication control programs associated with the processes. For example, the communication control programs associated with the processes performed by the wireless master device 20 described above are stored in the memory 202 and the communication control programs may also be read from the memory 202 by the processor 201 and executed by the processor 201.

[6] In order to recognize the state around a user, the wireless client device 10 may also include a sound collecting microphone and send, in addition to the current location information, a sound around the wireless client device 10 to the cellular base station 30.

[7] When the sending time period Ts is changed at Step S415 described above, the moving distance of the wireless client device 10 per unit time that is obtained from multiple pieces of current location information may also be considered. For example, the sending time period Ts is preferably decreased as the moving distance of the wireless client device 10 per unit time is increased.

[8] If the wireless client device 10 is not able to connect to the cellular base station 30 due to the radio wave being worse, the processor 101 may also accumulate the current location information in the memory 102 and sends, in bulk after the radio wave condition has been recovered, the current location information accumulated in the memory 102 to the cellular base station 30.

According to an aspect of an embodiment of the present invention, an advantage is provided in that it is possible to reliably continue transmission in case of emergency.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
   a wireless master device; and
   a wireless client device that communicates with the wireless master device and a base station, wherein the wireless client device:
      stores a first client device ID and a first master device ID in a memory included in the wireless client device, the first client device ID being an ID that is unique to the wireless client device, the first master device ID being an ID that is unique to the wireless master device;
      starts wireless transmission to the base station when the wireless client device receives a start instruction from the wireless master device and the first client device ID matches a second client device ID and the first master device ID matches a second master device ID, the second client device ID and the second master device ID being included in the start instruction, the second client device ID being an ID that is unique to the wireless client device, the second master device ID being an ID that is unique to the wireless master device; and
      stops the wireless transmission when the wireless client device receives a stop instruction from the wireless master device after the starting of the wireless transmission and the first client device ID matches a third client device ID and the first master device ID matches a third master device ID, the third client device ID and the third master device ID being included in the stop instruction, the third client device ID being an ID that is unique to the wireless client device, the third master device ID being an ID that is unique to the wireless master device.

2. A portable communication device that communicates with another communication device and a base station, the portable communication device comprising:
   a memory; and
   a processor coupled to the memory, wherein
   the processor executes a process comprising:
      storing a first client device ID and a first master device ID in the memory, the first client device ID being an ID that is unique to the portable communication device, the first master device ID being an ID that is unique to the other communication device;
      starting wireless transmission to the base station when a start instruction from the other communication device is received and the first client device ID matches a second client device ID and the first master device ID matches a second master device ID, the second client device ID and the second master device ID being included in the start instruction, the second client device ID being an ID that is unique to the portable communication device, the second master device ID being an ID that is unique to the other communication device; and
      stopping the wireless transmission when a stop instruction from the other communication device is received after the starting of the wireless transmission and the first client device ID matches a third client device ID and the first master device ID matches a third master device ID, the third client device ID and the third master device ID being included in the stop instruction, the third client device ID being an ID that is unique to the portable communication device, the third master device ID being an ID that is unique to the other communication device.

3. The portable communication device according to claim 2, wherein, in a state in which the portable communication device is located within a predetermined distance from the other communication device, when a predetermined time elapses from the starting of the wireless transmission, the processor stops the wireless transmission regardless of whether the stop instruction is received.

4. A wireless communication method performed in a communication system that includes a wireless master device, and a wireless client device that communicates with the wireless master device and a base station, the wireless communication method comprising:
   storing, by the wireless client device, a first client device ID and a first master device ID in a memory included in the wireless client device, the first client device ID being an ID that is unique to the wireless client device, the first master device ID being an ID that is unique to the wireless master device;
   sending, by the wireless master device, a start instruction to the wireless client device;
   starting, by the wireless client device, wireless transmission to the base station when the start instruction is received and the first client device ID matches a second client device ID and the first master device ID matches a second master device ID, the second client device ID and the second master device ID being included in the start instruction, the second client device ID being an ID that is unique to the wireless client device, the second master device ID being an ID that is unique to the wireless master device; and stopping, by the wireless client device, the wireless transmission when a stop instruction is received from the wireless master device after the starting of the wireless transmission and the first client device ID matches a third client device ID and the first master device ID matches a third master device ID, the third client device ID and the third master device ID being included in the stop instruction, the third client device ID being an ID that is unique to the wireless client device, the third master device ID being an ID that is unique to the wireless master device.

5. A non-transitory computer-readable recording medium having stored therein a communication control program used by a portable communication device that includes a first communication module that is capable of communicating with a base station, a second communication module that is capable of communicating with another communication device, and a processor, the communication control program causing the processor to execute a process comprising:

storing a first client device ID and a first master device ID in a memory included in the portable communication device, the first client device ID being an ID that is unique to the portable communication device, the first master device ID being an ID that is unique to the other communication device;

starting wireless transmission to the base station when a start instruction from the other communication device is received and the first client device ID matches a second client device ID and the first master device ID matches a second master device ID, the second client device ID and the second master device ID being included in the start instruction, the second client device ID being an ID that is unique to the portable communication device, the second master device ID being an ID that is unique to the other communication device; and stopping the wireless transmission when a stop instruction from the other communication device is received after the starting of the wireless transmission and the first client device ID matches a third client device ID and the first master device ID matches a third master device ID, the third client device ID and the third master device ID being included in the stop instruction, the third client device ID being an ID that is unique to the portable communication device, the third master device ID being an ID that is unique to the other communication device.

* * * * *